United States Patent
Munoz Mejia et al.

(10) Patent No.: US 9,096,100 B2
(45) Date of Patent: Aug. 4, 2015

(54) TIRE WITH CHAFER AND SIDEWALL

(71) Applicants: Luisa Fernanda Munoz Mejia, Arlon (CO); Manfred Josef Jung, Freisen (DE); Carlo Kanz, Mamer (LU)

(72) Inventors: Luisa Fernanda Munoz Mejia, Arlon (CO); Manfred Josef Jung, Freisen (DE); Carlo Kanz, Mamer (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 256 days.

(21) Appl. No.: 13/674,184

(22) Filed: Nov. 12, 2012

(65) Prior Publication Data
US 2014/0130954 A1    May 15, 2014

(51) Int. Cl.
*B60C 1/00*  (2006.01)
*B60C 13/00*  (2006.01)
*B60C 15/06*  (2006.01)
*C08K 3/04*  (2006.01)
*B60C 11/03*  (2006.01)
*C08L 7/00*  (2006.01)
*C08L 9/00*  (2006.01)

(52) U.S. Cl.
CPC ........... *B60C 11/0332* (2013.04); *B60C 1/0025* (2013.04); *B60C 15/06* (2013.01); *C08K 3/04* (2013.01); *C08L 7/00* (2013.01); *C08L 9/00* (2013.01); *B60C 2001/005* (2013.04); *Y10T 152/10828* (2015.01); *Y10T 152/10846* (2015.01)

(58) Field of Classification Search
CPC ...... B60C 1/0025; B60C 15/06; B60C 13/00; B60C 2001/005; B60C 2015/0614; B60C 2013/005; B60C 2013/006; C08K 3/04; Y10T 152/10828; Y10T 152/10846
USPC .................. 152/525, 543, 547; 524/495, 496
See application file for complete search history.

(56) References Cited

U.S. PATENT DOCUMENTS

| 4,387,759 | A |  | 6/1983 | Obata et al. |
| 5,160,384 | A |  | 11/1992 | Ueyoko et al. |
| 5,238,991 | A |  | 8/1993 | Magnus et al. |
| 5,253,690 | A |  | 10/1993 | Ueyoko et al. |
| 5,267,595 | A |  | 12/1993 | Lampe |
| 5,294,253 | A | * | 3/1994 | Carlson et al. ................ 524/496 |

(Continued)

FOREIGN PATENT DOCUMENTS

| EP | 0906838 A2 | 4/1999 |
| EP | 1033265 A2 | 9/2000 |

(Continued)

OTHER PUBLICATIONS
EPO Search Report dated Feb. 28, 2014.

*Primary Examiner* — Adrienne C Johnstone
(74) *Attorney, Agent, or Firm* — John D. DeLong

(57) ABSTRACT

A pneumatic tire has a pair of sidewalls overlying a carcass connecting a pair of bead components and a rubber chafer adjacent to each sidewall, the chafer including 100 parts by weight of elastomer; 20 to 60 phr of a low surface area carbon black having an Iodine absorption value of from about 10 to about 50 g/kg; 20 to 60 phr of a high surface area carbon black having an Iodine absoption value of from about 100 to about 300 g/kg, each sidewall including 100 phr of the same elastomer used in the chafers; 20 to 60 phr of the same low surface area carbon black used in the chafers; 10 to 20 phr of the same high surface area carbon black used in the chafers, the weight ratio of high surface area carbon black in the chafers to high surface area carbon black in the sidewalls being greater than 1.

2 Claims, 1 Drawing Sheet

(56) References Cited

U.S. PATENT DOCUMENTS

| | | | |
|---|---|---|---|
| 5,430,087 A * | 7/1995 | Carlson et al. | 524/496 |
| 5,476,129 A | 12/1995 | Shoyama | |
| 5,531,256 A | 7/1996 | Hashimoto et al. | |
| 5,733,395 A | 3/1998 | Nakagawa | |
| 5,979,527 A | 11/1999 | Kobayashi et al. | |
| 6,121,346 A * | 9/2000 | Visel et al. | 524/495 |
| 6,257,290 B1 | 7/2001 | Sakamoto et al. | |
| 6,478,064 B1 | 11/2002 | Ueyoko | |
| 7,019,065 B2 * | 3/2006 | McNutt et al. | 524/495 |
| 7,150,301 B2 | 12/2006 | Serra et al. | |
| 7,628,190 B2 | 12/2009 | Takahashi et al. | |
| 7,654,295 B2 | 2/2010 | Kasai | |
| 2001/0036993 A1 * | 11/2001 | McNutt et al. | 524/495 |
| 2004/0016495 A1 | 1/2004 | Serra et al. | |
| 2004/0198890 A1 * | 10/2004 | Kanenari | 524/495 |
| 2005/0209394 A1 | 9/2005 | Sandstrom et al. | |
| 2006/0054259 A1 | 3/2006 | Takahashi et al. | |
| 2009/0209690 A1 | 8/2009 | Sandstrom | |

FOREIGN PATENT DOCUMENTS

| | | |
|---|---|---|
| EP | 1125976 A1 | 8/2001 |
| EP | 1674296 A1 | 6/2006 |
| EP | 2193939 A1 | 6/2010 |
| EP | 2422999 A1 | 2/2012 |

* cited by examiner

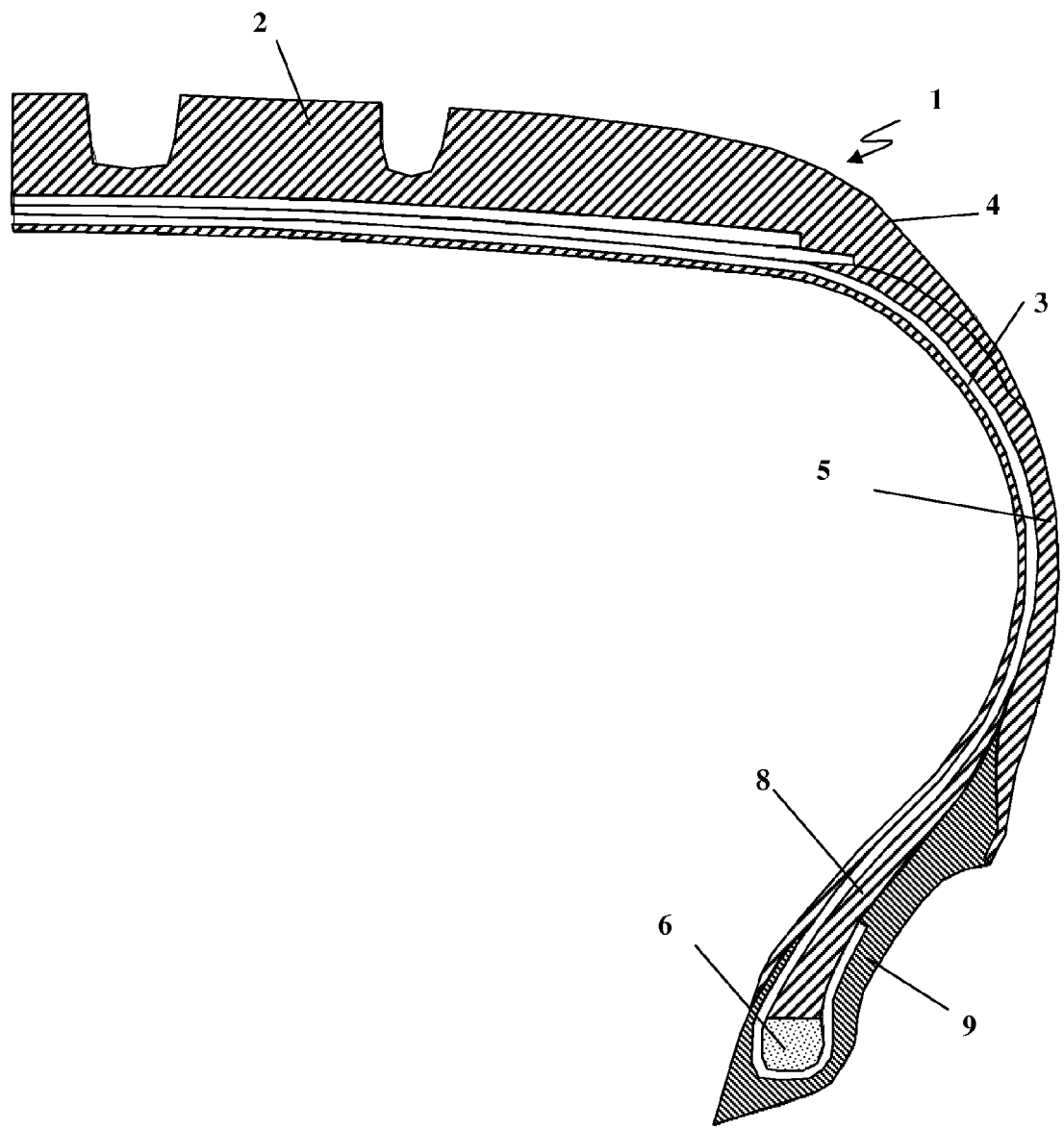

TIRE WITH CHAFER AND SIDEWALL

BACKGROUND OF THE INVENTION

Pneumatic rubber tires conventionally have two spaced apart, relatively inextensible beads, usually composed of twisted, or cabled, metallic wires, which are surrounded by rubber components. A significant component which is conventionally positioned around a portion of the bead is the chafer. The chafer is a rubber composition conventionally designed to contact a rigid wheel rim and, therefore, interface between the tire and rim. Rather obviously, the chafer rubber composition must normally be very abrasion resistant, tough, and have a relatively high modulus while also having acceptable flex and rubber fatigue properties as well as having good resistance to cut growth.

The chafer rubber composition is conventionally composed of a diene-based rubber composition which is carbon black reinforced. The chafer rubber composition may optionally contain a textile fabric reinforcement for dimensional stability, where the textile fabric portion of the chafer is conventionally adjacent to the bead portion of the tire, leaving the rubber portion of the chafer to contact the rigid wheel rim when the tire is mounted on such rim and inflated.

Pneumatic tire chafers, their intended interface between the tire bead and rigid wheel rim, as well as their rather demanding physical properties, are considered herein to be well known to those skilled in such art.

Its rubber composition is conventionally composed, for example, of cis 1,4-polyisoprene and cis 1,4-polybutadiene rubber(s) in order to have good abrasion resistance and durability.

Given the different properties required for the chafer and the adjacent sidewall, the chafer and sidewall are generally made of rubber compounds with different elastomers and carbon blacks, however, this reduces the ability of the tire manufacturer to recycle, or "rework," excess rubber compound in the rubber mixing process.

SUMMARY OF THE INVENTION

The present invention relates to a pneumatic tire having a pair of spaced apart bead components, a connecting carcass between the bead components, a pair of sidewalls overlying the carcass, and a rubber chafer adjacent to each of the sidewalls and positioned around at least a portion of each of the bead components and intended for contacting a rigid rim of a wheel, wherein the chafers comprise 100 parts by weight of elastomer; 20 to 60 phr of a low surface area carbon black having an Iodine absorption value in a range of from about 10 to about 50 as measured by ASTM D1510; 20 to 60 phr of a high surface area carbon black having an Iodine absorption value in a range of from about 100 to about 300 g/kg as measured by ASTM D1510; wherein the sidewalls comprise 100 phr of the same elastomer used in the chafers; 20 to 60 phr of the same low surface area carbon black used in the chafers; 10 to 20 phr of the same high surface area carbon black used in the chafers; wherein the weight ratio of high surface area carbon black in the chafer to high surface area carbon black in the sidewall is greater than 1.

BRIEF DESCRIPTION OF THE DRAWINGS

FIG. 1 illustrates a tire according to the present invention.

DETAILED DESCRIPTION OF THE INVENTION

The present invention relates to a pneumatic tire having a pair of spaced apart bead components, a connecting carcass between the bead components, a pair of sidewalls overlying the carcass, and a rubber chafer adjacent to each of the sidewalls and positioned around at least a portion of each of the bead components and intended for contacting a rigid rim of a wheel,
wherein the chafers comprise
100 parts by weight of elastomer;
20 to 60 phr of a low surface area carbon black having an Iodine absorption value in a range of from about 10 to about 50 as measured by ASTM D1510;
20 to 60 phr of a high surface area carbon black having an Iodine absorption value in a range of from about 100 to about 300 g/kg as measured by ASTM D1510;
wherein the sidewalls comprise
100 phr of the same elastomer used in the chafers;
20 to 60 phr of the same low surface area carbon black used in the chafers;
10 to 20 phr of the same high surface area carbon black used in the chafers;
wherein the weight ratio of high surface area carbon black in the chafer to high surface area carbon black in the sidewall is greater than 1.

For illustration of one embodiment of the invention, reference is made to FIG. 1, in which is depicted a cross-sectional view of a belted radial ply tire 1.

In FIG. 1, components of tire 1 are shown as being its tread 2, sidewall(s) 5, shoulder region(s) 4 abridging the tread 2 and sidewall(s) 5, spaced "bundled" wire beads 6 with apexes 8 and supporting fabric reinforced carcass 3.

The chafer component 9 of the tire is positioned in its bead region 6, basically between the bead 6 and the rigid tire rim on which the tire is to be mounted.

In various embodiments, the rubber compositions may contain a rubber containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate. Additional examples of rubbers which may be used include a carboxylated rubber, silicon-coupled and tin-coupled starbranched polymers. In one embodiment the rubber or elastomers are polybutadiene and synthetic or natural polyisoprene.

In one embodiment, the rubber may be a blend of at least two diene based rubbers. In one embodiment, a blend of two or more rubbers may be used such as cis 1,4-polyisoprene rubber (natural or synthetic) and cis 1,4-polybutadiene rubbers.

In one embodiment, the rubber may be a blend of from 40 to 60 phr of polybutadiene, and from 60 to 40 phr of polyisoprene.

The solution polymerization prepared SBR (S-SBR) typically has a bound styrene content in a range of about 5 to about 50, alternatively about 9 to about 36, percent. The S-SBR can be conveniently prepared, for example, by organo lithium catalyzation in the presence of an organic hydrocarbon solvent.

The cis 1,4-polybutadiene rubber (BR) is considered to be beneficial for a purpose of enhancing the tire wear. Such BR can be prepared, for example, by organic solution polymerization of 1,3-butadiene. The BR may be conveniently characterized, for example, by having at least a 90 percent cis 1,4-content.

The term "phr" as used herein, and according to conventional practice, refers to "parts by weight of a respective material per 100 parts by weight of rubber, or elastomer."

Commonly employed siliceous pigments which may be used in the rubber compounds include conventional pyrogenic and precipitated siliceous pigments (silica). In one embodiment precipitated silica is used. The conventional siliceous pigments that may be employed in this invention are in one embodiment precipitated silicas such as, for example, those obtained by the acidification of a soluble silicate, e.g., sodium silicate.

Such conventional silicas might be characterized, for example, by having a BET surface area, as measured using nitrogen gas, in one embodiment in the range of about 40 to about 600, and in another embodiment in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia-Solvay, with, for example, designations of Z1165MP, Z165GR, and Z200MP and silicas available from Degussa AG with, for example, designations VN2 and VN3, etc.

The rubber compositions include high surface carbon black and low surface carbon black.

Representative of such high surface area carbon black for purposes of this invention are rubber reinforcing carbon blacks which have an Iodine absorption value in a range of from about 100 to about 300 g/kg. Representative of such carbon blacks are, for example, according to their ASTM designations, N110, N121, N134, N220, N233, N234, N242, and N293.

Representative of such lower surface area carbon black for purposes of this invention are rubber reinforcing carbon blacks which have an Iodine absorption value in a range of from about 10 to about 50, alternately about 25 to about 50, g/kg. Representative of such carbon blacks are, for example, according to their ASTM designations, N539, N550, N582, N630, N642, N650, N660, N683, N754, N762, N765, N774 and N787 and, also, N907, N907, N990 and N991.

The chafer composition includes from 20 to 60 phr of a low surface area carbon black having an Iodine absorption value in a range of from about 10 to about 50 as measured by ASTM D1510, and from 20 to 60 phr of a high surface area carbon black having an Iodine absorption value in a range of from about 100 to about 300 g/kg as measured by ASTM D1510.

The sidewall composition includes from 20 to 60 phr of the same low surface area carbon black used in the chafers, and from 10 to 20 phr of the same high surface area carbon black used in the chafers.

In one embodiment, the weight ratio of high surface area carbon black in the chafer to high surface area carbon black in the sidewall is greater than 1.

In one embodiment, the weight ratio of high surface area carbon black in the chafer to high surface area carbon black in the sidewall is from 1.1 to 3.

In one embodiment, the weight ratio of high surface area carbon black in the chafer to high surface area carbon black in the sidewall is from 1.5 to 2.5.

In one embodiment the rubber composition for use in the tire component may additionally contain a sulfur containing organosilicon compound. Examples of suitable sulfur containing organosilicon compounds are of the formula:

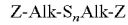

Z-Alk-S$_n$Alk-Z $\qquad$ I in which Z is selected from the group consisting of

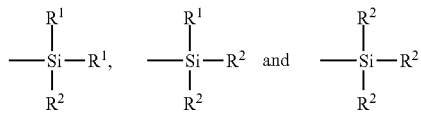

where R$^5$ is an alkyl group of 1 to 4 carbon atoms, cyclohexyl or phenyl; R$^6$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl) octasulfide, 3,3'-bis(trimethoxysilylpropyl)tetrasulfide, 2,2'-bis(triethoxysilylethyl)tetrasulfide, 3,3'-bis(trimethoxysilylpropyl) trisulfide, 3,3'-bis(triethoxysilylpropyl)trisulfide, 3,3'-bis (tributoxysilylpropyl)disulfide, 3,3'-bis (trimethoxysilylpropyl) hexasulfide, 3,3'-bis (trimethoxysilylpropyl) octasulfide, 3,3'-bis (trioctoxysilylpropyl)tetrasulfide, 3,3'-bis (trihexoxysilylpropyl)disulfide, 3,3-bis(tri-2"-ethylhexoxysilylpropyl)trisulfide, 3,3'-bis (triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl) tetrasulfide,bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide,3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl) tetrasulfide,3,3'-bis(ethyl di-sec. butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl) tetrasulfide,12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide.

In one embodiment the sulfur containing organosilicon compounds are the 3,3'-bis(trimethoxy or triethoxy silylpropyl) sulfides. In one embodiment the compounds are 3,3'-bis(triethoxysilylpropyl)disulfide and 3,3'-bis(triethoxysilylpropyl)tetrasulfide. Therefore as to the above formula I, in one embodiment Z is

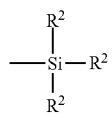

where $R^6$ is an alkoxy of 2 to 4 carbon atoms, with 2 carbon atoms being used in one embodiment; alk is a divalent hydrocarbon of 2 to 4 carbon atoms with 3 carbon atoms being used in one embodiment; and n is an integer of from 2 to 5 with 2 and 4 being used in one embodiment.

The amount of the sulfur containing organosilicon compound of the above formula in a rubber composition will vary depending on the level of other additives that are used. Generally speaking, the amount of the compound of the above formula will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur vulcanizing agent is elemental sulfur. The sulfur vulcanizing agent may be used in an amount ranging from 0.5 to 8 phr, with a range of from 1.5 to 6 phr being used in one embodiment. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils in an amount ranging from 0 to 30 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, in another embodiment about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator is in one embodiment a guanidine, dithiocarbamate, thiuram, or a second sulfenamide compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber and compound is mixed in one or more non-productive mix stages. The terms "non-productive" and "productive" mix stages are well known to those having skill in the rubber mixing art. If the rubber composition contains a sulfur-containing organosilicon compound, one may subject the rubber composition to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

The chafer and sidewall may be a components of various types of pneumatic tires, including but not limited to passenger car tires, truck tires, aircraft tires, and off-the-road tires.

The chafer and sidewall may be constructed by any of various rubber processing methods as are known in the art, including but not limited to calendaring and extrusion. The tire with the chafer may be constructed using methods as are known in the art.

Vulcanization of the tire is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air.

The invention is further illustrated by the following non-limiting example.

EXAMPLE

In this example, the use of a modified sidewall compound for use as a chafer compound is illustrated. A sidewall compound containing high and low surface area carbon blacks was modified to include 15 phr additional high surface area black but excluded processing oil, as shown in Table 1.

TABLE 1

| Compound[1] | Parts (phr) |
| --- | --- |
| Synthetic cis 1,4-polyisoprene rubber | 50 |
| Cis 1,4-polybutadiene rubber A[2] | 50 |
| Rubber reinforcing carbon black (B) (N220)[3] | 30 |
| Rubber reinforcing carbon black (C) (N550)[4] | 30 |
| Process oil | 0 |

[1]The compound further contained standard amounts of waxes, antidegradants, zinc oxide, stearic acid, sulfur, and cure accelerators.
[2]Cis 1,4-polybutadiene, unmodified in a sense of not being coupled (e.g. not tin or silicon coupled) or functionalized (e.g. not functionalized with terminal or in-chain functional groups) as BUD 1207 ™ from The Goodyear Tire & Rubber Company
[3]Carbon black as N220, an ASTM designation, reportedly having an Iodine absorption value (ASTM D1510) of about 121 g/kg and DBP (dibutylphthalate) absorption value (ASTM D2414) of about 114 cc/100 g.
[4]Carbon black as N550, an ASTM designation, reportedly having an Iodine absorption value (ASTM D1510) of about 43 g/kg and DBP (dibutylphthalate) absorption value (ASTM D2414) of about 121 cc/100 g.

The cured compound showed acceptable levels of hysteresis and abrasion for use as a chafer. Additionally, the use of the same elastomer matrix and carbon blacks allows for reuse of the sidewall and chafer compounds in a rework mix steps, either reworked sidewall compound in a chafer mix, or reworked chafer compound in a sidewall mix.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a pair of spaced apart bead components, a connecting carcass between the bead components, a pair of sidewalls overlying the carcass, and a rubber chafer adjacent to each of the sidewalls and positioned around at least a portion of each of the bead components and intended for contacting a rigid rim of a wheel, wherein the chafers comprise 100 parts by weight of elastomer;

20 to 60 phr of a low surface area carbon black having an Iodine absorption value in a range of from 10 to 50 as measured by ASTM D1510;

20 to 60 phr of a high surface area carbon black having an Iodine absorption value in a range of from 100 to 300 g/kg as measured by ASTM D1510;

wherein the sidewalls comprise 100 phr of the same elastomer used in the chafers;

20 to 60 phr of the same low surface area carbon black used in the chafers;

10 to 20 phr of the same high surface area carbon black used in the chafers;

wherein the weight ratio of high surface area carbon black in the chafer to high surface area carbon black in the sidewall ranges from 1.5 to 2.5.

2. The pneumatic tire of claim 1, wherein the 100 parts by weight of elastomer comprises from 40 to 60 phr of polybutadiene, and from 60 to 40 phr of synthetic polyisoprene.

* * * * *